US012675031B2

(12) United States Patent
Guo

(10) Patent No.: US 12,675,031 B2
(45) Date of Patent: Jul. 7, 2026

(54) VEHICLE-MOUNTED CAMERA HOLDER

(71) Applicant: Shenzhen Auto-vox Technology Co., Ltd, Shenzhen (CN)

(72) Inventor: Feng Guo, Guangdong (CN)

(73) Assignee: Shenzhen Auto-vox Technology Co., Ltd, Shenzhen (CN)

( * ) Notice: Subject to any disclaimer, the term of this patent is extended or adjusted under 35 U.S.C. 154(b) by 145 days.

(21) Appl. No.: 18/433,385

(22) Filed: Feb. 5, 2024

(65) Prior Publication Data

US 2025/0224656 A1 Jul. 10, 2025

(30) Foreign Application Priority Data

Jan. 8, 2024 (CN) .......................... 202410032492.6
Jan. 8, 2024 (CN) .......................... 202420054372.1

(51) Int. Cl.
*G03B 17/56* (2021.01)
*B60R 11/00* (2006.01)
*B60R 11/04* (2006.01)

(52) U.S. Cl.
CPC ............ *G03B 17/561* (2013.01); *B60R 11/04* (2013.01); *B60R 2011/0017* (2013.01); *B60R 2011/0089* (2013.01)

(58) Field of Classification Search
None
See application file for complete search history.

(56) References Cited

U.S. PATENT DOCUMENTS

| | | | | |
|---|---|---|---|---|
| 9,161,110 B1 * | 10/2015 | Patis | ..................... | H04R 1/026 |
| D798,940 S * | 10/2017 | Costa | ........................... | D16/245 |
| D969,200 S * | 11/2022 | Lin | .............................. | D16/242 |
| D973,127 S * | 12/2022 | Wu | .............................. | D16/242 |
| 11,703,070 B2 * | 7/2023 | Calhoun | .............. | F16M 11/128 |
| | | | | 396/419 |
| 2020/0224685 A1 * | 7/2020 | Calhoun | ................ | G03B 17/56 |

(Continued)

FOREIGN PATENT DOCUMENTS

| | | | | | |
|---|---|---|---|---|---|
| CN | 105051297 A | * | 11/2015 | ............. | E04G 21/28 |
| CN | 115071594 A | * | 9/2022 | ............. | B60R 11/04 |

(Continued)

OTHER PUBLICATIONS

Review the Cheapest, Car Back Seat Phone Holder—Headrest Mount for iPhone and Android, web.archive.org/web/20220328004315/ https://www.youtube.com/watch?v=IdeRqG_nPC0, Mar. 28, 2022. (Year: 2022).*

(Continued)

*Primary Examiner* — Rodney E Fuller
(74) *Attorney, Agent, or Firm* — Che-Yang Chen

(57) ABSTRACT

A vehicle-mounted camera holder includes a holder body including a camera installing portion for holding a camera, and a clamping element including a clamping body coupled to the holder body, wherein the clamping body includes a first clamping portion and a second clamping portion movably coupled to the first clamping portion to define a clamping cavity which is switched between an open state in which an access opening is formed to allow the installation element to enter the clamping cavity and a closed state in which the installation element is clamped at the clamping cavity without the need for an additional tool.

20 Claims, 9 Drawing Sheets

(56)         References Cited

U.S. PATENT DOCUMENTS

2022/0325850 A1 * 10/2022 Park ......................... F16B 2/18
2023/0240445 A1 * 8/2023 Koulopoulos ....... G03B 17/561
                                                              396/428

FOREIGN PATENT DOCUMENTS

CN        219257217 U  * 6/2023
KR        102681340 B1 * 7/2024   ........... G03B 17/561

OTHER PUBLICATIONS

Nyatek, Headrest Phone Holder, Universal Car Back Seat Headrest
Phone Mount Holder Stand Bracket for iPhone X XR 7 6, Amazon,
Date First Available Dec. 26, 2020. (Year: 2020).*

* cited by examiner

VEHICLE-MOUNTED CAMERA HOLDER

CROSS REFERENCE OF RELATED APPLICATION

This application is a non-provisional application that claims priority under 35 U.S.C. § 119 to China application number CN202410032492.6, filing date Jan. 8, 2024, and China application number CN202420054372.1, filing date Jan. 8, 2024, wherein the entire content of which is expressly incorporated herein by reference.

BACKGROUND OF THE PRESENT INVENTION

Field of Invention

The present invention relates to camera holder, and more particular to a vehicle-mounted camera holder.

Description of Related Arts

A camera installed in the car can monitor the situation inside the car in real time and has become widely used. Especially for the situation where there is a baby in the car, installing a camera in the car can monitor the baby's situation in real time to ensure the baby's safety.

Specifically, when carrying a baby in a car, a baby seat is usually installed in the back seat to place the baby. Although a rear view mirror is installed in the car, the rear view mirror is relatively high and also cannot guarantee clarity in dim light conditions. In this way, it is difficult for the person sitting in the front seat to monitor or observe the baby's condition in real time, making it difficult to ensure the baby's safety. The driver may also be nervous and less focused due to concerns about the baby's condition, which is more dangerous.

Therefore, a camera facing the baby seat can be installed in the car and connected to a terminal device. In this way, the baby's status can be observed in real time through the terminal device which can be placed in a convenient viewing position. And the camera, which has night vision function, can present the baby's image relatively clearly even in low light conditions.

However, in practical applications, there is a problem of inconvenient installation when mounting the camera on the vehicle. The inventor of this application has found that currently, the installation of cameras usually requires the use of tools or is a cumbersome process. For example, the housing for mounting the camera includes two parts, and the two parts are connected by screws. When installing the camera on the support rod for mounting the headrest in the car, it is necessary to use a screwdriver to loosen the screws connecting the two parts of the housing, and then place the housing for mounting the camera on the support rod for mounting the headrest. Finally, tighten the screws connecting the two parts of the housing with the screwdriver. Another example is to employ a strap and an installation body for mounting the housing for holding the camera, and the installation body for mounting the housing for holding the camera is connected to the strap, and the strap can be tied to the headrest, and then the housing for holding the camera can be coupled to the installation body. Another example is to detach the headrest or the support rod for mounting the headrest from the car seat, and then the housing for holding the camera is sleeved on the support rod for mounting the headrest, and finally re-install the headrest or the support rod for mounting the headrest back to the car seat.

SUMMARY OF THE PRESENT INVENTION

The invention is advantageous in that it provide a vehicle-mounted camera holder which is easy to install, so as to bring convenience to the user during installation.

Another advantage of the present application is to provide a vehicle-mounted camera holder which can be installed on the corresponding installation element without the need for an additional tool.

Another advantage of the present application is to provide a vehicle-mounted camera holder, wherein in some embodiments, the clamping element of the vehicle-mounted camera holder achieves the opening and closing of the clamping cavity through a locking structure, so as to achieve the opening and closing of the clamping cavity without the need for an additional tool, thereby achieving the convenient installation of the vehicle-mounted camera holder.

Another advantage of the present application is to provide a vehicle-mounted camera holder, wherein in some embodiments, the clamping element of the vehicle-mounted camera holder achieves the opening and closing of the clamping cavity through its own elasticity, so that the structure is simple, and can achieve the opening and closing of the clamping cavity without the need for an additional tool, thereby achieving the easy installation of the vehicle-mounted camera holder.

Another advantage of the present application is to provide a vehicle-mounted camera holder, wherein the vehicle-mounted camera holder is suitable for being installed on a rod-shaped installation element, such as a support rod for installing a headrest of a car seat or a rod-shaped bracket of a baby stroller.

Another advantage of the present application is to provide a vehicle-mounted camera holder, wherein in some embodiments, the clamping element of the vehicle-mounted camera holder is used to clamp the installation element, and the clamping element is provided with a flexible layer in its clamping cavity, so that it can be installed with installation elements with different radial sizes.

Another advantage of the present application is to provide a vehicle-mounted camera holder, wherein when the vehicle-mounted camera holder is installed on the installation element, the camera installing portion of the vehicle-mounted camera holder can rotate 360 degrees relative to the installation element, so that the camera installed on the camera installing portion can be adjusted to a suitable position according to actual needs.

In order to achieve at least one of the above advantages or other advantages and objectives, according to one aspect of the present application, a vehicle-mounted camera holder, which is suitable for being installed on a rod-shaped installation element is provided, wherein the vehicle-mounted camera holder comprises:

a holder body comprising a clamping element installing portion and a camera installing portion; and a clamping element which is installed on the clamping element installing portion, the clamping element comprising a first clamping portion and a second clamping portion, the first clamping portion and the second clamping portion are enclosing to form a clamping cavity which is capable of accommodating the rod-shaped installation element, the second clamping portion is movably connected to the first clamping portion, so that the clamping cavity can be switched between an open state and a closed state without the need for an additional tool.

According an embodiment of the present application, the clamping element further comprises a locking structure, wherein the locking structure is installed in a lockable manner between the first clamping portion and the second clamping portion, so that the clamping cavity can be switched between a locked state and an unlocked state. When the clamping cavity is in the locked state, the clamping cavity is closed, and the first clamping portion and the second clamping portion are locked by the locking structure, and cannot move with respect to each other. When the clamping cavity is in the unlocked state, the first clamping portion or the second clamping portion is released by the locking structure, and thus can move with respect to each other.

According an embodiment of the present application, the first clamping portion comprise a first clamping end portion and a second clamping end portion that are opposite to each other, and the second clamping element comprise a first clamping end part and a second clamping end part that are opposite to each other. The first clamping end part is pivotally connected to the first clamping end portion, and the clamping element further comprises a first pivot axle pivotally connecting the first clamping end part with the first clamping end portion.

According an embodiment of the present application, the locking structure comprises a first movable member and a second movable member. The first movable member comprises a connecting end part and a free end part that are opposite to each other. The connecting end part is pivotally connected to the second clamping end portion. The clamping element further comprises a second pivot axle which pivotally connects the connecting end part with the second clamping end portion. The second movable body comprises a first connecting part and a second connecting part that are opposite to each other. The first connecting part is pivotally connected to the connecting end part. The clamping element further comprises a third pivot axle which pivotally connect the first connecting part with the connecting end part. The second connecting part is detachably clipped to the second clamping end part.

According an embodiment of the present application, the second connecting part is in a hook shape, and the second clamping end part has a slot, the second connecting part is adapted to be engaged with the slot.

According an embodiment of the present application, the second pivot axle and the third pivot axle are not coaxial.

According an embodiment the present application, the first clamping element and/or the second clamping element are made of an elastic material.

According an embodiment of the present application, the clamping element further comprises at least one flexible layer which is located on an inner side of the first clamping element and/or the second clamping element.

According an embodiment of the present application, the clamping element is rotatably installed on the holder body, and the clamping element further comprises a steering ball which is connected to the first clamping portion or the second clamping portion, and the steering ball is accommodated within the clamping element installing portion and rotatably installed therein.

According an embodiment of the present application, the clamping element installing portion has an opening. The clamping element installing portion comprises a first cavity section and a second section which is extended from the first cavity section to the opening, and the minimum inner diameter of the second cavity section is smaller than the diameter of the steering ball.

According to anther aspect of the present application, a vehicle-mounted camera holder for being mounted on an installation element is provided, the installation element is a support rod of a headrest, the vehicle-mounted camera holder comprises:

a holder body which comprises a camera installing portion for holding a camera; and a clamping element which comprises a clamping body coupled to the holder body, wherein the clamping body comprises a first clamping portion and a second clamping portion movably coupled to the first clamping portion to define a clamping cavity which is switched between an open state in which an access opening is formed to allow the installation element to enter the clamping cavity and a closed state in which the installation element is clamped at the clamping cavity without the need for an additional tool.

According an embodiment of the present application, the clamping element comprises a locking structure lockably coupled to the first clamping portion and the second clamping portion, wherein the locking structure is switched between a locked state for shifting the clamping cavity into the closed state and an unlocked state to allow the clamping body to define the access opening which is communicated to the clamping cavity.

According an embodiment of the present application, the first clamping portion is pivotally coupled to the second clamping portion at a first side of the clamping body, wherein the locking structure is coupled between the first clamping portion and the second clamping portion at a second side of the clamping body opposite to the first side of the clamping body.

According an embodiment of the present application, the locking structure is pivotally connected to the first clamping portion and is detachably coupled to the second clamping portion, wherein in the locked state, the locking structure is locked with the second clamping portion, wherein in the unlocked state, the locking structure is detached from the second clamping portion, so as to define the access opening between the first clamping portion and the second clamping portion.

According an embodiment of the present application, the locking structure comprises a first movable member and a second movable member which is movably coupled to the second movable member, wherein the first movable member is pivotally connected to the first clamping portion, the second movable member is detachably and lockably coupled with the second clamping portion.

According an embodiment of the present application, the second movable member comprises a first connecting part which is pivotally connected to the first movable member and a second connecting part which is detachably and lockably coupled with the second clamping portion.

According an embodiment of the present application, in the locked state, the second connecting part of the second movable member is engaged with the second clamping portion through a hook which is engaged with a slot.

According an embodiment of the present application, the first movable member is configured to be flipped down to prevent the pivotal movement of the first connecting part of the second movable member, so as to retain the second connecting part of the second movable member on the second clamping portion, and the first movable member is configured to be flipped up to allow the pivotal movement of the first connecting part of the second movable member, so as to allow the second connecting part of the second movable member to be disengaged with the second clamping portion.

According an embodiment of the present application, the clamping element further comprises a first pivot axle, a second pivot axle, and a third pivot axle, wherein the first clamping portion is pivotally connected to the second clamping portion by the first pivot axle at the first side of the clamping body, wherein the first clamping portion is pivotally connected to the first movable member by the second pivot axle, wherein the first connecting part of the second movable member is pivotally connected to the first movable member by the third pivot axle.

According an embodiment of the present application, the second pivot axle is provided at an outer side of the third pivot axle in such a manner that the pivotal movement of the first movable member with respect to the second pivot axle is capable of adjusting the position of the third pivot axle.

According an embodiment of the present application, the first clamping portion has a second gap, wherein the first movable member comprises a connecting end part which is extended into the second gap and pivotally connected to the first clamping portion by two the second pivot axles, and a free end part which is capable of being flipped up and down.

According an embodiment of the present application, the connecting end part of the first movable member has a third gap, wherein the first connecting part of the second movable member is extended into the third gap of the connecting end part of the first movable member.

According an embodiment of the present application, the locking structure is configured in such a manner that when the locking structure is moved between the locked state and the unlocked state, the pivotal movement of the first movable member and the pivotal movement of the second movable member are in two opposite directions.

According an embodiment of the present application, the holder body is movably with respect to the clamping element, so as to adjust a position of the camera installed at the camera installing portion.

According an embodiment of the present application, a steering ball is provided for rotatably coupling the holder body with the clamping element, so as to adjust a position of the camera installed at the camera installing portion.

According an embodiment of the present application, the steering ball is connected to the clamping body, wherein the holder body comprises a clamping element installing portion, wherein the steering ball is disposed in the clamping element installing portion and is rotatable in 360 degrees.

According an embodiment of the present application, the clamping element installing portion has an opening and comprises a first cavity section and a second cavity section which is extended from the first cavity section to the opening, wherein an minimum inner diameter of the second cavity section is smaller than a diameter of the steering ball.

According an embodiment of the present application, the clamping element installing portion comprises at least two clamping element installing portion bodies which are spaced apart from each other and arranged circumferentially, wherein the holder body further comprises a cover body which is fitted outside the clamping element installing portion to tighten the clamping element installing portion to prevent the steering ball from easily coming off the clamping element installing portion.

According an embodiment of the present application, one or more flexible layers are disposed in the clamping body.

According an embodiment of the present application, at least one of the first clamping portion and the second clamping portion is made of an elastic material, so as to achieve the switch between the opening state and the closed state by the elasticity of the clamping element.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The terms and phrases used in the following specification and claims are not limited to their literal meanings, but are only used by the inventor to enable a clear and consistent understanding of the present application. Therefore, the following description of various embodiments of the present application is provided for the purpose of illustration and not to limit the scope of the present application as defined by the appended claims and their equivalents, which are obvious to those skilled in the art.

It should be understood that the term "a" or "an" should be understood as "at least one" or "one or more", that is, in one embodiment, the number of a component can be one, while in another embodiment, the number of the component can be more than one. The term "a" or "an" should not be understood as limiting the quantity.

Although ordinal numbers such as "first", "second", etc. will be used to describe various components, it is not intended to limit those components. This term is only used to distinguish one component from another. For example, the first component can be referred to as the second component, and likewise, the second component can also be referred to as the first component, without departing from the teachings of the present application. The term "and/or" used herein includes any and all combinations of the listed items, whether one or more.

The terms used herein are only for the purpose of describing various embodiments and are not intended to be limiting. As used herein, the singular form is also intended to include the plural form, unless clearly indicated otherwise in context. Additionally, the terms "include" and/or "have" are understood to specify the presence of the features, numbers, steps, operations, components, elements, or combinations thereof as described in this specification, without excluding one or more other features, numbers, steps, operations, components, elements, or combinations thereof or additional ones.

Figure 1:
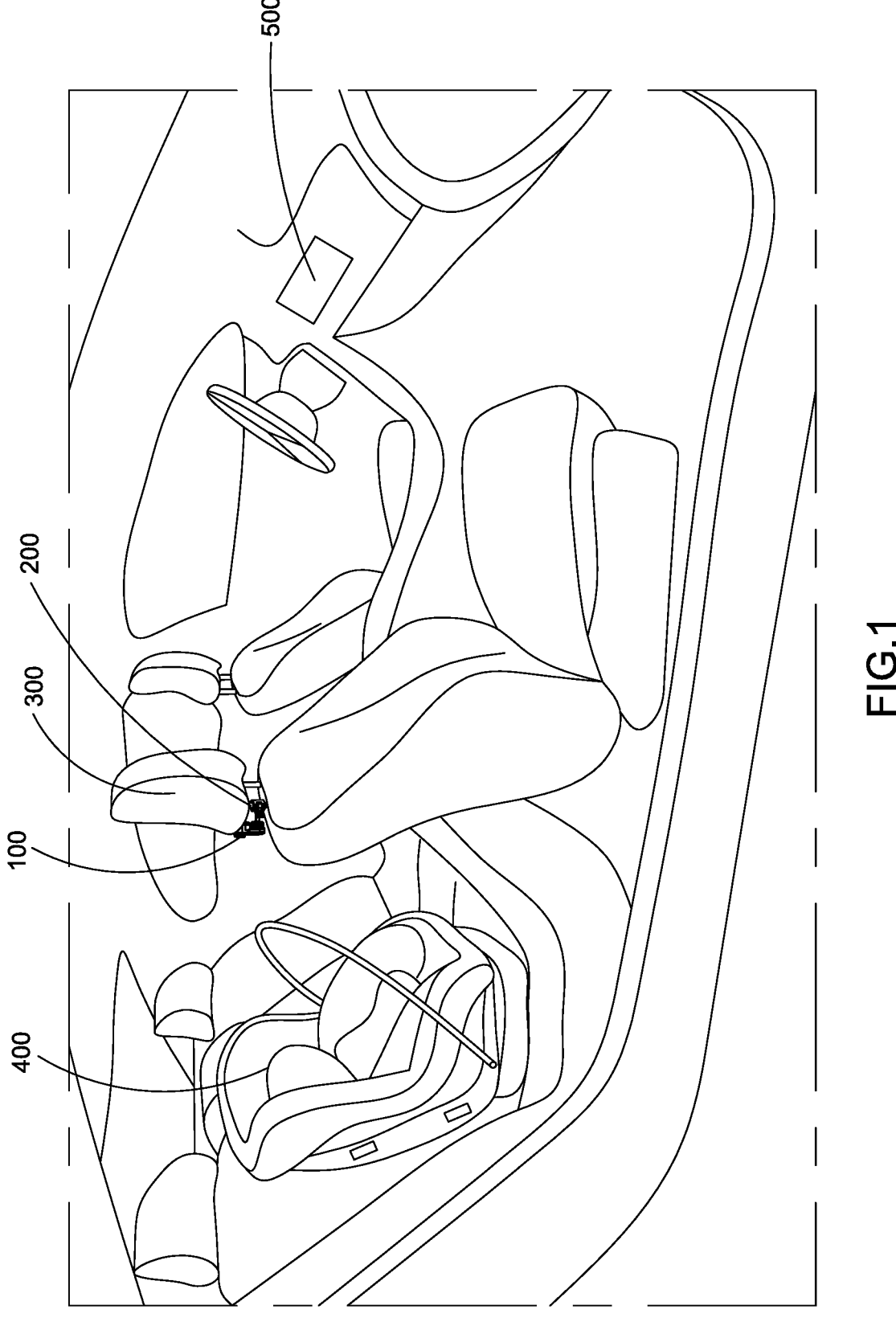
FIG. 1 is a schematic view illustrating an application scenario of a vehicle-mounted camera holder according to an embodiment of the present application.
Figure 2:
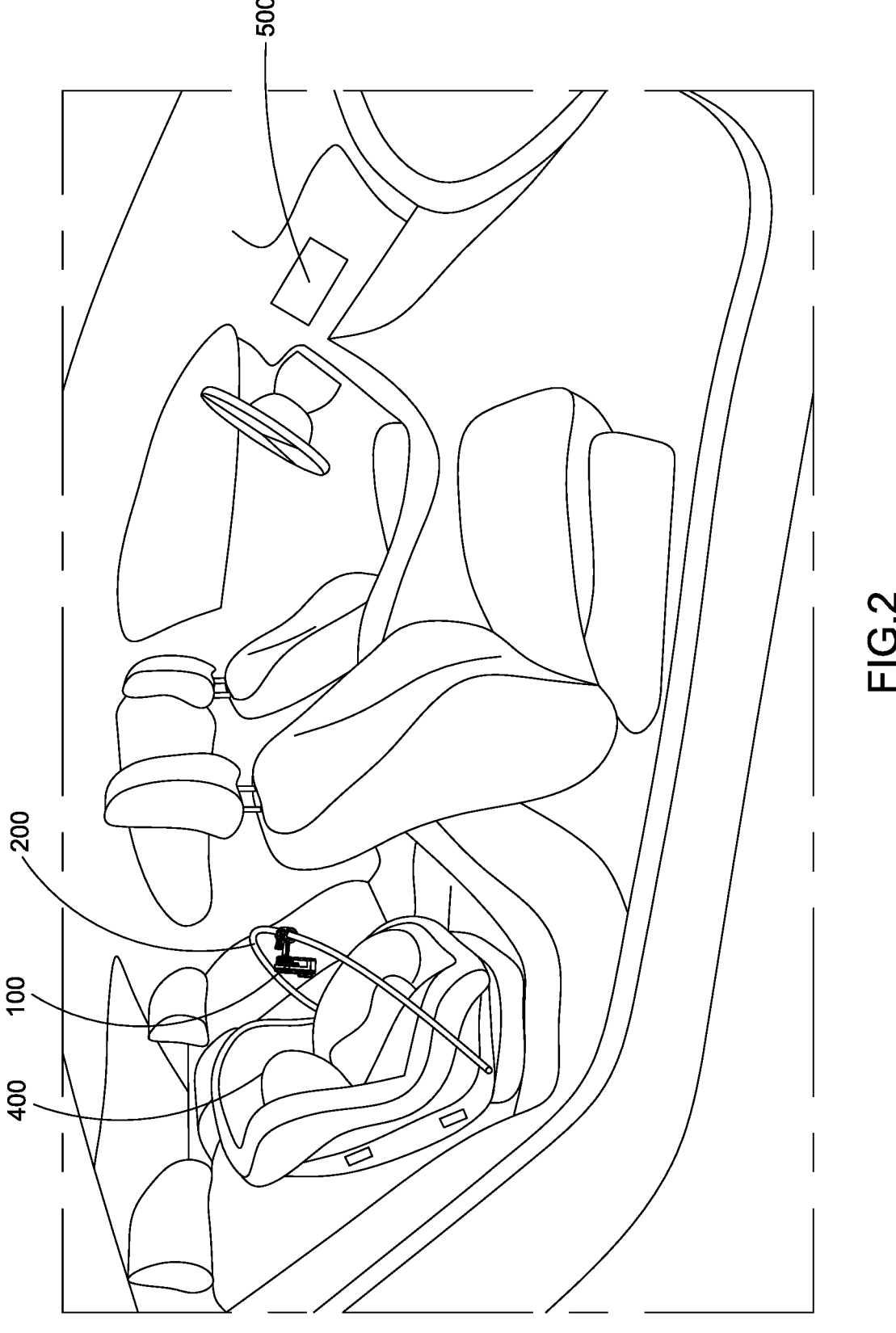
FIG. 2 is a schematic view illustrating another application scenario of the vehicle-mounted camera holder according to the embodiment of the present application.

Referring to FIGS. 1 to 9B of the drawings of this application, a vehicle-mounted camera holder 100 according to an embodiment of the present invention is described. The vehicle-mounted camera holder 100 is suitable for being installed on a rod-shaped installation element 200, such as a support rod for installing a headrest 300 of a car seat (as shown in FIG. 1) or a rod-shaped bracket for a baby seat 400 (as shown in FIG. 2). The cross-section of the installation element 200 is circular, but it can also be other shapes, such as elliptical, semi-circular, polygonal, etc. The vehicle-mounted camera holder 100 is suitable for installing a camera 30. In some application scenarios, the vehicle-mounted camera holder 100 with the camera 30 can be installed on the support rod for installing the headrest 300 of a car seat or the rod-shaped bracket for the baby seat 400, with the camera 30 facing a baby seat 400. The camera 30 can be communicatively connected to a terminal device 500. The terminal device 500 comprises a display screen which is used to display the image of the baby captured by the camera 30. In this way, the status of the baby can be observed in real time through the terminal device 500.

Figure 3:
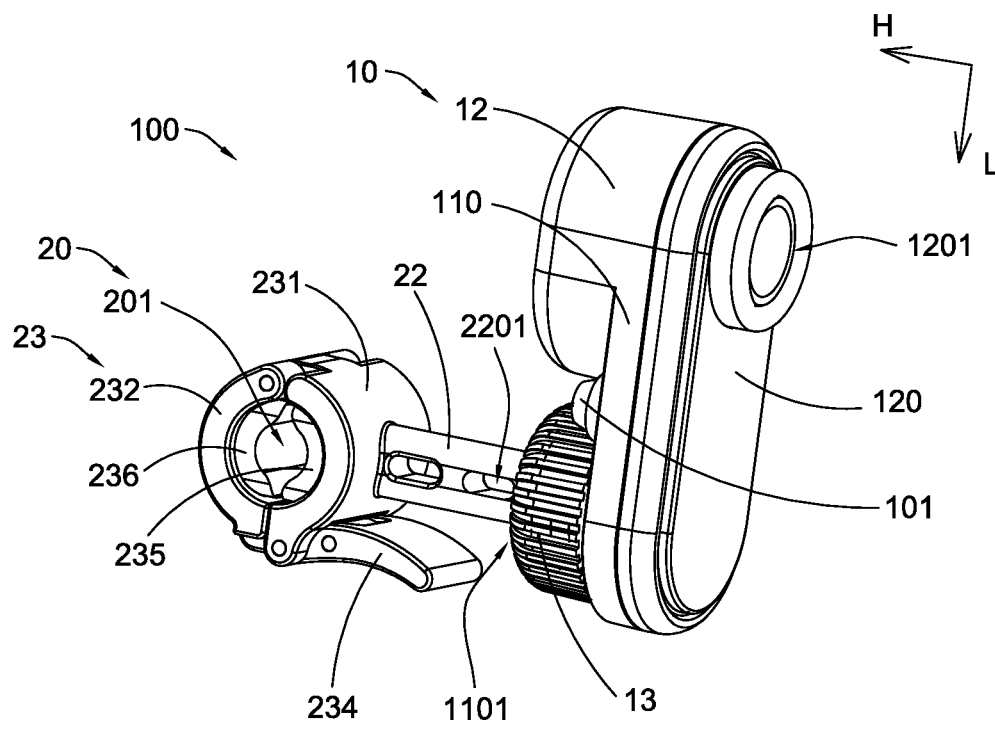
FIG. 3 is a perspective view of the vehicle-mounted camera holder according to the embodiment of the present application.
Figure 4A:
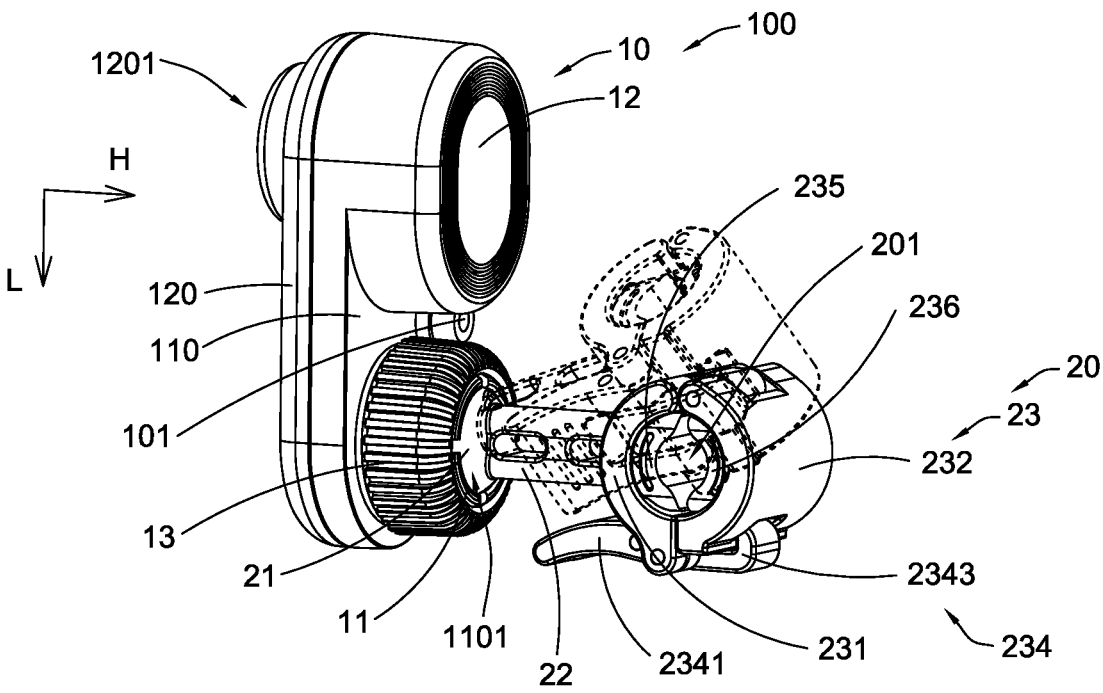
FIGS. 4A, 4B and 4C are perspective views illustrating the angle adjustment of the vehicle-mounted camera holder according to the embodiment of the present application.
Figure 4B:
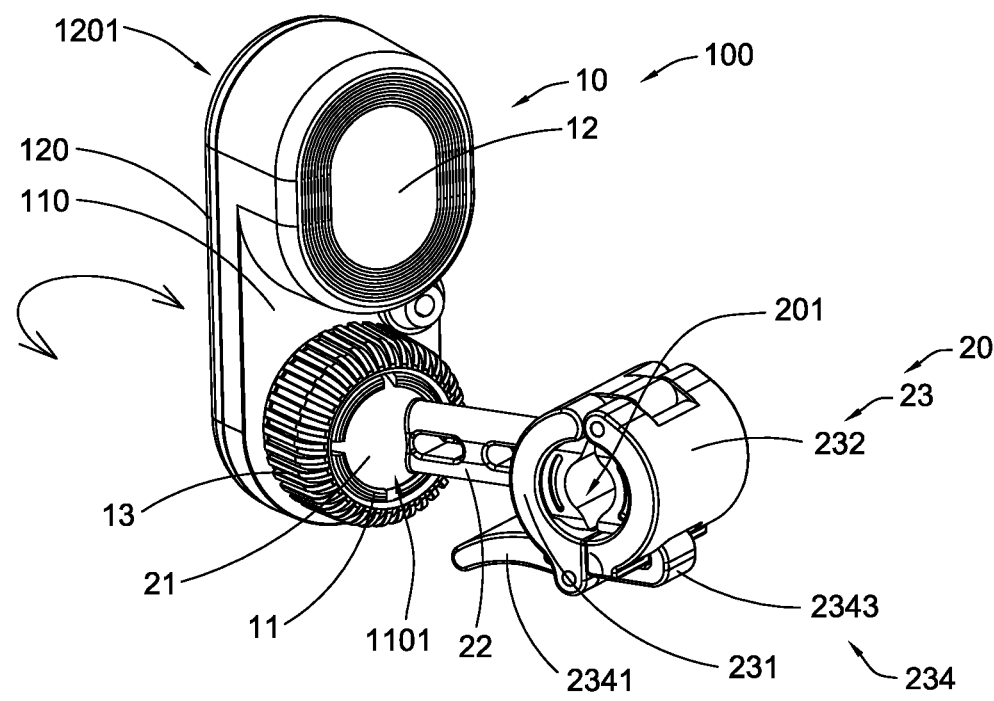
Figure 4C:
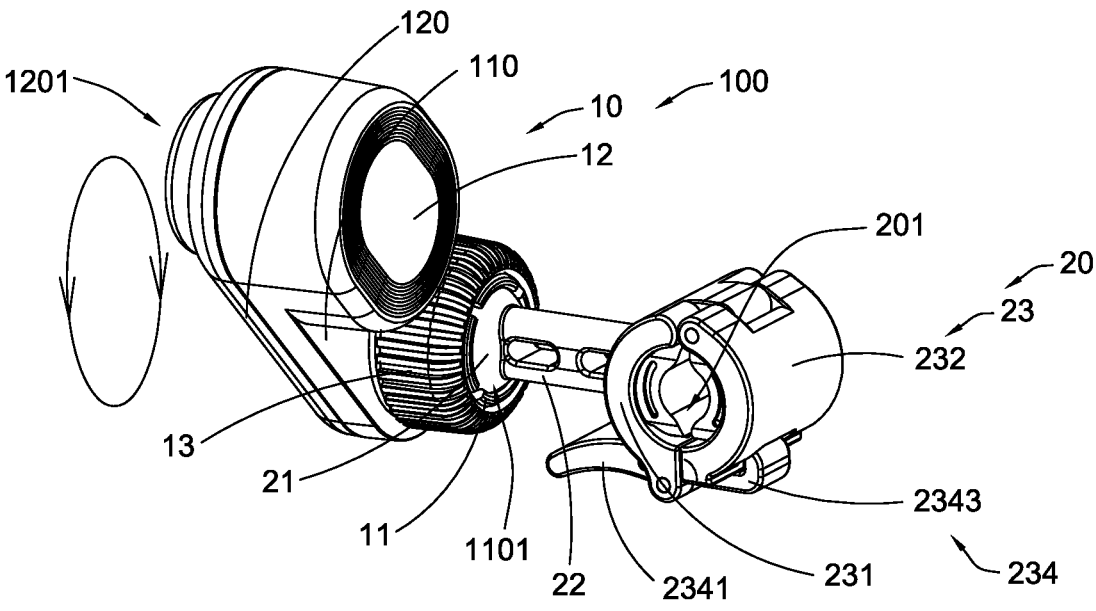

As shown in FIGS. 3 to 4C, the vehicle-mounted camera holder 100 comprises a holder body 10 and a clamping element 20. The holder body 10 comprises a clamping element installing portion 11 and a camera installing portion 12, wherein the clamping element installing portion 11 is suitable for installing the clamping element 20, and the camera installing portion 12 is suitable for installing the camera 30. Correspondingly, the clamping element 20 is installed on the clamping element installing portion 11 of the holder body 10. It is worth mentioning that in this embodiment of the present application, the vehicle-mounted camera holder 100 is easy to install, so as to bring convenience to the user. Specifically, the vehicle-mounted camera holder 100 can be easily clamped to the installation element 200 by the clamping element 20 without the need for an additional tool. For example, the clamping element 20 of the vehicle-mounted camera holder 100 achieves the opening and closing of a clamping cavity 201 through a locking structure 234, so as to realize the installation of the vehicle-mounted camera holder 100; or, the clamping element 20 of the vehicle-mounted camera holder 100 achieves the opening and closing of the clamping cavity 201 through its own elasticity, so as to realize the installation of the vehicle-mounted camera holder 100.

Correspondingly, the clamping element 20 comprises a first clamping portion 231 and a second clamping portion 232. The first clamping portion 231 and the second clamping portion 232 together form the clamping cavity 201 which is adapted to accommodate the rod-shaped installation element 200. The second clamping portion 232 is movably connected to the first clamping portion 231, so that the clamping cavity 201 can be switched between an open state and a closed state without the need for an additional tool.

In an embodiment in which the opening and closing of the clamping cavity 201 is achieved through the locking structure 234, the clamping element 20 further comprises the locking structure 234. The locking structure 234 is securely and lockable installed between the first clamping portion 231 and the second clamping portion 232, allowing the clamping cavity 201 to be switched between a locked state and an unlocked state. When the clamping cavity 201 is in the locked state, the clamping cavity 201 is closed, and the first clamping portion 231 and the second clamping portion 232 are locked by the locking structure 234 and cannot move relative to each other. When the clamping cavity 201 is in the unlocked state, the first clamping portion 231 or the second clamping portion 232 is released by the locking structure 234, allowing them to be able to move with respect to each other.

In the embodiment in which the opening and closing of the clamping cavity 201 is achieved through the locking structure 234, the specific structure of the clamping element 20 is not limited in the present application. In some embodiments of the present application, the first clamping portion 231 comprises a first clamping body 2311, a first clamping end portion 2312, and a second clamping end portion 2313. The first clamping body 2311, the first clamping end portion 2312, and the second clamping end portion 2313 are integrally formed, or integrally connected, or are separate components which are joined together. The first clamping end portion 2312 and the second clamping end portion 2313 are positioned opposite to each other and are respectively located on two sides of the first clamping body 2311. The second clamping portion 232 comprises a second clamping body 2321, a first clamping end part 2322, and a second clamping end part 2323. The second clamping body 2321, the first clamping end part 2322, and the second clamping end part 2323 are integrally formed, or integrally connected, or are separate components which are joined together. The first clamping end part 2322 and the second clamping end part 2323 are positioned opposite to each other and are respectively located on two sides of the second clamping body 2321. The first clamping end part 2322 of the second clamping portion 232 is pivotally connected to the first clamping end portion 2312 of the first clamping portion 231. The clamping element 20 further comprises a first pivot axle 233 which is connected to the first clamping end portion 2312 of the first clamping portion 231 and the first clamping end part 2322 of the second clamping portion 232 to form a pivot rotation axle between the first clamping portion 231 and the second clamping portion 232, so that the second clamping portion 232 can be rotatably installed on the first clamping portion 231.

Figure 5:
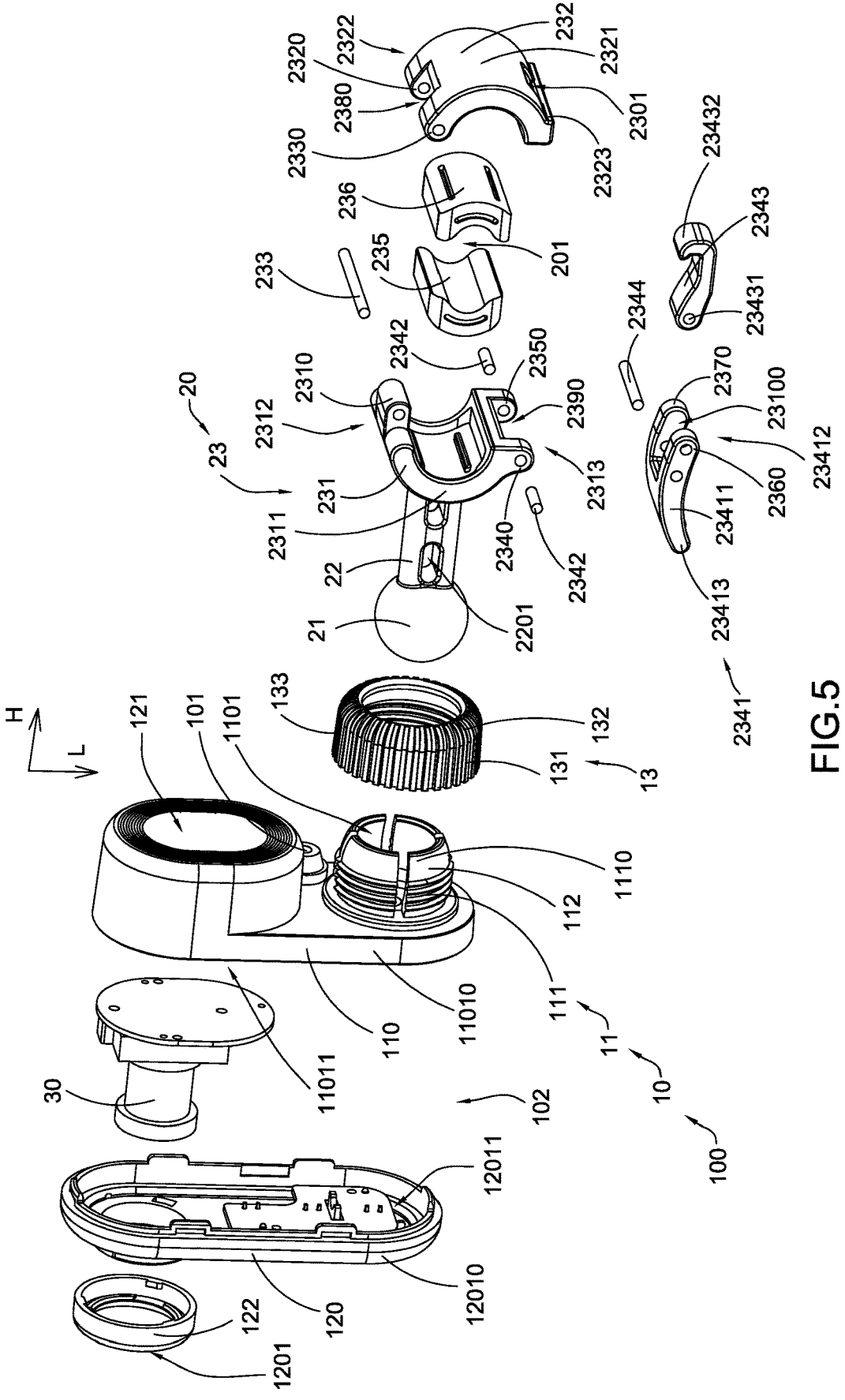
FIG. 5 is an exploded view of the vehicle-mounted camera holder according to the embodiment of the present application.

The specific structures of the first clamping end portion 2312 and the first clamping end part 2322 are not limited in the present application. In the example of the present application, as shown in FIG. 5, the first clamping end portion 2312 of the first clamping portion 231 comprises a first protruding part 2310 which is protruded from the first clamping body 2311. The first clamping end part 2322 of the second clamping portion 232 comprises a second protruding part 2320 and a third protruding part 2330. The second protruding part 2320 and the third protruding part 2330 protrude from the second clamping body 2321. The second protruding part 2320 and the third protruding part 2330 are spaced apart from each other, and a first gap 2380 is formed between the second protruding part 2320 and the third protruding part 2330. The first protruding part 2310 of the first clamping end portion 2312 is extended into the first gap 2380 of the first clamping end part 2322.

The locking structure 234 comprises a first movable member 2341 and a second movable member 2343. The first movable member 2341 comprises a first movable body 23411, a connecting end part 23412, and a free end part 23413. The first movable body 23411, the connecting end part 23412, and the free end part 23413 are integrally formed, or integrally connected, or are separate components which are joined together. The connecting end part 23412 of the first movable member 2341 is pivotally connected to the second clamping end portion 2313 of the first clamping portion 231. The clamping element 20 further comprises a second pivot axle 2342 which is connected to the connecting end part 23412 of the first movable member 2341 and the second clamping end portion 2313 of the first clamping portion 231 to form a pivot rotation axle between the first movable member 2341 and the first clamping portion 231, so that the first movable member 2341 can be pivotally installed on the first clamping portion 231.

The specific structures of the connecting end part 23412 of the first movable member 2341 and the second clamping end portion 2313 of the first clamping portion 231 are not limited in this application. In the example of this application, as shown in FIG. 5, the second clamping end portion 2313 of the first clamping portion 231 comprises a fourth protruding part 2340 and a fifth protruding part 2350. The fourth protruding part 2340 and the fifth protruding part 2350 are spaced apart from each other, and a second gap 2390 is formed between the fourth protruding part 2340 and the fifth protruding part 2350. The connecting end part 23412 of the first movable member 2341, which is protruded from the first movable member 23411, is extended into the second gap 2390.

The connecting end part 23412 of the first movable member 2341 comprises a sixth protruding part 2360 and a seventh protruding part 2370. The sixth protruding part 2360 and the seventh protruding part 2370, which are respectively protruded from the first movable member 23411, are spaced apart from each other, and a third gap 23100 is formed between the sixth protruding part 2360 and the seventh protruding part 2370. The clamping element 20 corresponding comprises two second pivot axles 2342, and one second pivot axle 2342 is used to pivotally connect the fourth protruding part 2340 to the sixth protruding part 2360, and the other second pivot axle 2342 is used to pivotally connect the fifth protruding part 2350 to the seventh protruding part 2370.

The second movable member 2343 comprises a first connecting part 23431 and a second connecting part 23432 that are opposite to each other. The first connecting part 23431 of the second movable member 2343 is pivotally connected to the connecting end part 23412 of the first movable member 2341. Specifically, the first connecting part 23431 of the second movable member 2343 is extended into the third gap 23100. The clamping element 20 further comprises a third pivot axle 2344, and the third pivot axle

2344 is connected to the first connecting part 23431 of the second movable member 2343 and the connecting end part 23412 of the second movable member 2343. The second pivot axles 2342 and the third pivot axle 2344 are not coaxial. It should be understood that the specific structures of the connecting end part 23412 of the first movable member 2341 and the second clamping end portion 2313 of the first clamping portion 231, as well as the specific structure of the first connecting part 23431, can also be implemented in other manners.

The second connecting part 23432 of the second movable member 2343 is detachably clipped to the second clamping end part 2323 of the second clamping portion 232. The second connecting part 23432 is in a hook shape, and the second clamping end part 2323 has a slot 2301. The second connecting part 23432 of the second movable member 2343 is adapted to be engaged with the slot 2301 of the second clamping end part 2323. Alternatively, the slot 2301 is formed in the second connecting part 23432, and the hook is formed on the second clamping end part 2323. As shown in FIG. 5, the second pivot axles 2342 are provided at an outer side of the third pivot axle 2344, so that the pivotal movement of the first movable member 2341 with respect to the second movable member 2343 is able to adjust a position of the third pivot axle 2344, so as to prevent or allow the pivotal movement of the second movable member 2343, and thus to prevent or allow the disengagement between the slot 2301 and the second connecting part 23432.

It should be understood that the connecting end part 23412 of the first movable member 2341 can also be configured to be pivotally connected to the second clamping end part 2323 of the second clamping portion 232. The second clamping end portion 2313 can be provided with the slot 2301, and the second connecting part 23432 of the second movable member 2343 can be configured to be engaged with the slot 2301 of the second clamping end portion 2313 of the first clamping portion 231. The specific implementation of the connecting end part 23412 of the first movable member 2341 being pivotally connected to the second clamping end part 2323 of the second clamping portion 232 is not limited to the present application.

It should also be understood that the locking structure 234 can also be other structures capable of locking and unlocking.

Next, the opening and closing process of the clamping cavity 201 of the clamping element 20 with the locking structure 234 will be described.

Figures 6A, 6B, 6C, 6D:
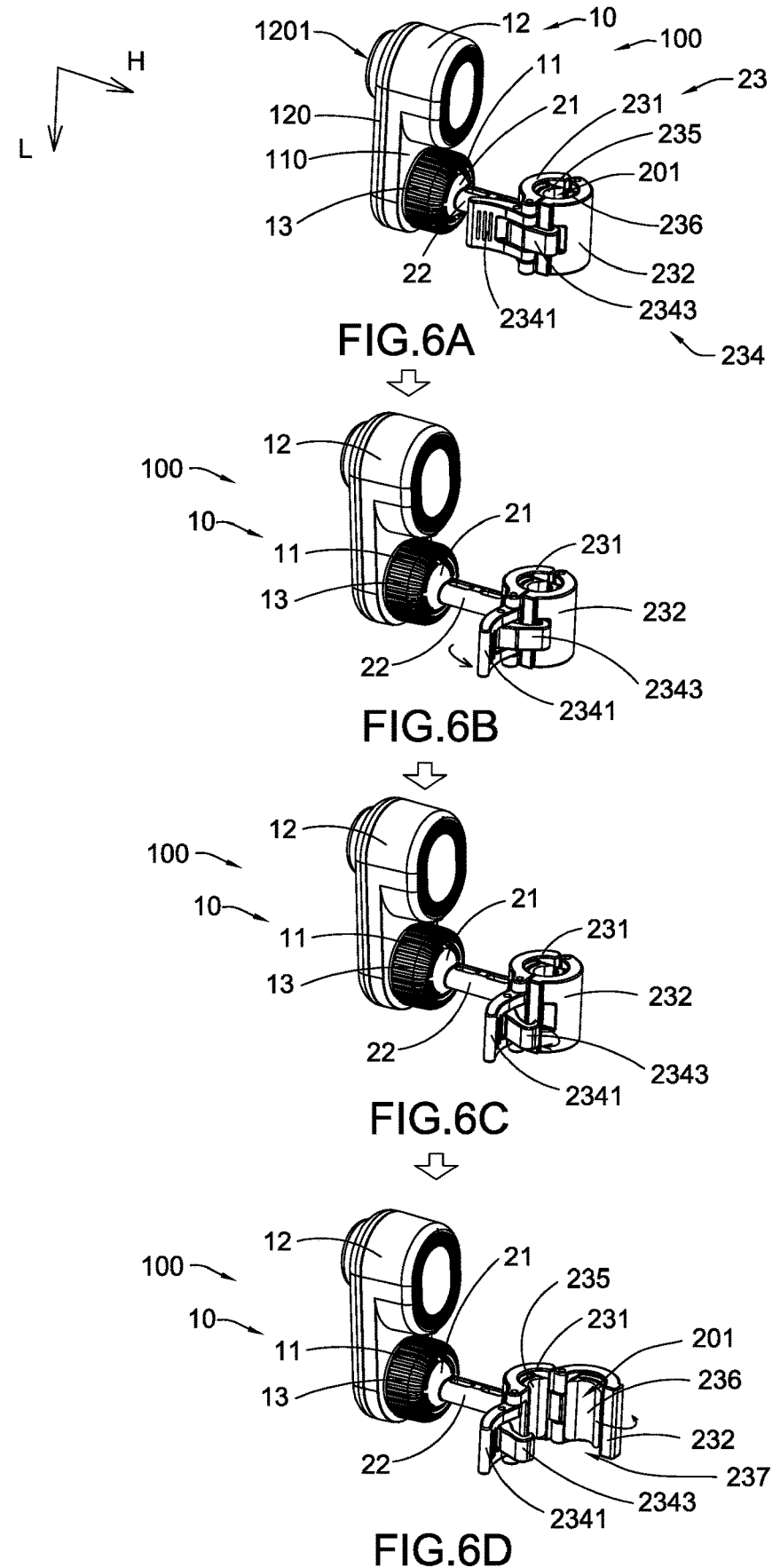
FIGS. 6A, 6B, 6C and 6D are schematic views illustrating the process of opening and closing the clamping cavity of the vehicle-mounted camera holder according to the embodiment of the present application.

As shown in FIGS. 5 to 7B, when the connecting end part 23412 of the first movable member 2341 is connected to the second clamping end portion 2313 of the first clamping portion 231, and the second connecting part 23432 of the second movable member 2343 is adapted to be engaged with the slot 2301 of the second clamping end part 2323 of the second clamping portion 232, the clamping cavity 201 can be closed and locked by the locking structure 234, the second connecting part 23432 of the second movable member 2343 is engaged with the slot 2301 of the second clamping portion 232, and as shown in FIG. 6A, the first movable member 2341 can be in a flipping down state, and the angle between the first movable member 2341 and the second clamping end part 2323 of the second clamping portion 232 is small. The free end part of 23413 of the first movable member 2341 is at a position away from the second connecting part 23432 of the second movable member 2343, so that the third pivot axle 2344 is moved to a position does not allow the pivotal movement of the second clamping end part 2323 of the second clamping portion 232, so that the second clamping end part 2323 of the second clamping portion 232 is retained at the slot 2301 of the second clamping portion 232.

During the process of opening the clamping cavity 201, the first movable member 2341 can be flipped up first, as shown in FIG. 6B, and then the second movable member 2343 can be detached from the slot 2301 of the second clamping portion 232, and the second movable member 2343 can be flipped outward, as shown in FIG. 6C. During the process of outwardly flipping the first movable member 2341 to flip up the first movable member 2341, the first movable member 2341 rotates in the direction away from the second clamping end portion 2313 of the first clamping portion 231, and the angle between the first movable member 2341 and the second clamping end portion 2313 of the first clamping portion 231 increases; the first movable member 2341 rotates in the direction towards the second clamping end part 2323 of the second clamping portion 232, and the angle between the first movable member 2341 and the second clamping end part 2323 of the second clamping portion 232 decreases, the third pivot axle 2344 is moved along with the first movable member 2341 until reaching a position which allow the pivotal movement of the second clamping end part 2323 of the second clamping portion 232, so that the second clamping end part 2323 of the second clamping portion 232 can be disengaged with the slot 2301 of the second clamping portion 232; the second movable member 2343 is lifted outward accordingly, and the second connecting part 23432 of the second movable member 2343 is gradually detached from the slot 2301. During the process of outwardly flipping the second movable member 2343, the second movable member 2343 rotates in the direction away from the second clamping end part 2323 of the second clamping portion 232, so that the second clamping portion 232 is released, and the second movable member 2343 and the first movable member 2341 can move with respect to each other, and the clamping cavity 201 can be opened or closed. When the clamping cavity 201 is in the open state, the second clamping end portion 2313 of the first clamping portion 231 and the second clamping end part 2323 of the second clamping portion 232 are away from each other, as shown in FIG. 6D, and an access opening 237 is formed between the second clamping end portion 2313 of the first clamping portion 231 and the second clamping end part 2323 of the second clamping portion 232, allowing an object, such as the installation element 200, to enter the clamping cavity 201. When the clamping cavity 201 is in the closed state, the second clamping end portion 2313 of the first clamping portion 231 and the second clamping end part 2323 of the second clamping portion 232 are close to each other, and the gap between the second clamping end portion 2313 of the first clamping portion 231 and the second clamping end part 2323 of the second clamping portion 232 is minimized, or even there is almost no gap between the second clamping end portion 2313 of the first clamping portion 231 and the second clamping end part 2323 of the second clamping portion 232.

Figures 7A, 7B, 7C, 7D:
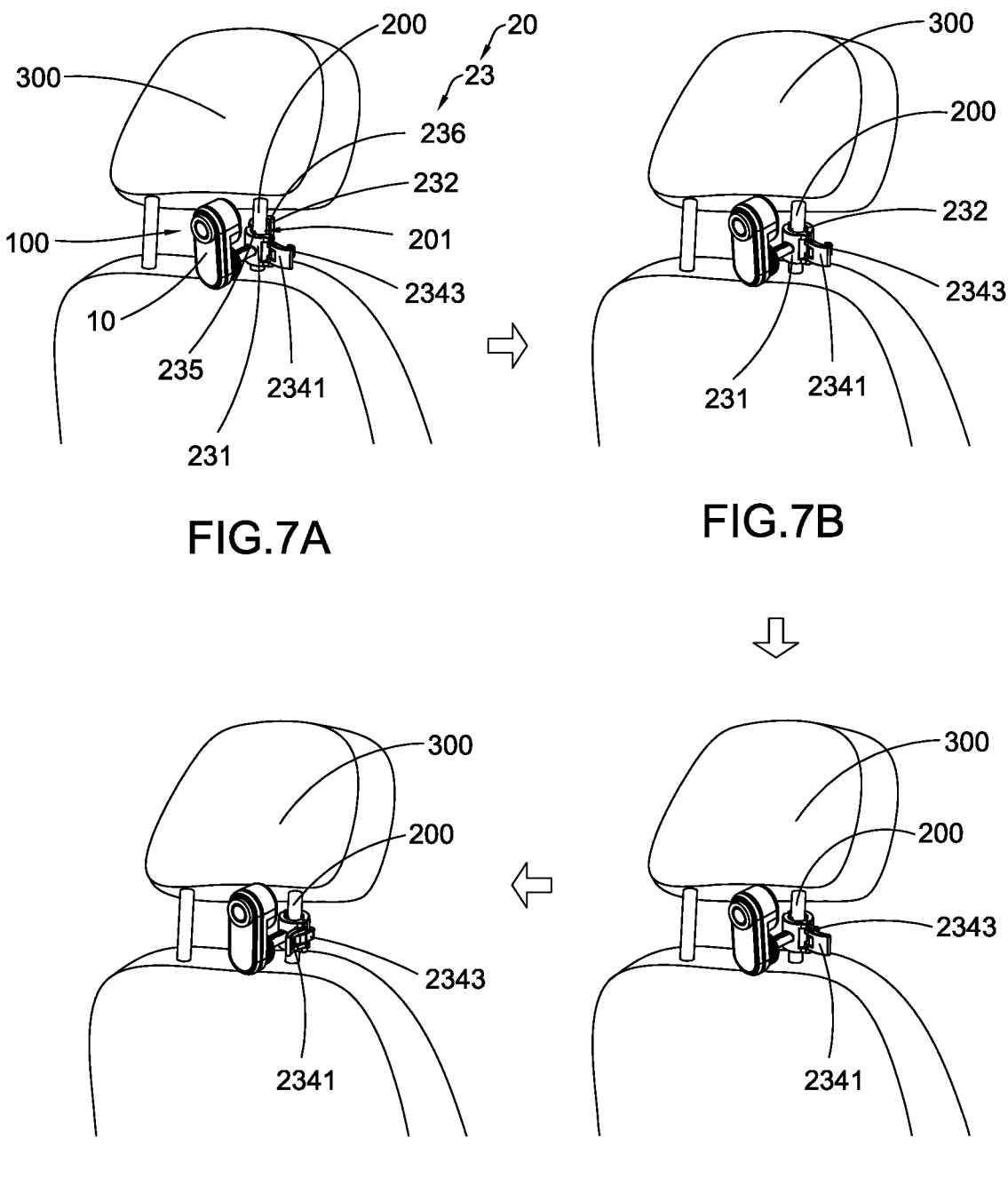
FIGS. 7A, 7B, 7C and 7D are schematic views illustrating the opening and closing process of a clamping cavity of the vehicle-mounted camera holder according to the embodiment of the present application.

After opening the clamping cavity 201, the clamping cavity 201 can be fitted with the installation element 200, as shown in FIG. 7A; then, the clamping cavity 201 is closed, as shown in FIG. 7B; subsequently, the closed clamping cavity 201 is locked by the locking structure 234, as shown in FIGS. 7C and 7D. During the process of locking the closed clamping cavity 201 with the locking structure 234, the second connecting part 23432 of the second movable member 2343 is engaged with the slot 2301 of the second clamping end part 2323; then, the first movable member

2341 is flipped inward to be in the flipping down state. During the process of inwardly flipping the first movable member 2341, the first movable member 2341 is rotated towards the second clamping end portion 2313 of the first clamping portion 231, reducing the angle between the first movable member 2341 and the second clamping end portion 2313 of the first clamping portion 231; as a result, the first connecting part 23431 of the second movable member 2343 is correspondingly pulled, and the second connecting part 23432 of the second movable member 2343 is tightly engaged with the slot 2301; the first clamping portion 231 and the second clamping portion 232 are locked, and thus cannot move with respect to each other, so that the clamping cavity 201 is in the locked state.

If the connecting end part 23412 of the first movable member 2341 is connected to the second clamping end part 2323 of the second clamping portion 232, the second clamping end portion 2313 has the slot 2301, the second connecting part 23432 of the second movable member 2343 is adapted to be engaged with the slot 2301 of the second clamping end portion 2313 of the first clamping portion 231, when the clamping cavity 201 is closed and locked by the locking structure 234, the second connecting part 23432 of the second movable member 2343 is engaged with the slot 2301 of the first clamping portion 231, and the first movable member 2341 is in the flipping down state, and the angle between the first movable member 2341 and the second clamping end part 2323 of the second clamping portion 232 is small.

During the process of opening the clamping cavity 201, the first movable member 2341 can be flipped up first, and then the second movable member 2343 can be detached from the slot 2301 of the first clamping portion 231, and the second movable member 2343 can be flipped outward. During the process of flipping up the first movable member 2341, the first movable member 2341 rotates towards a direction away from the second clamping end part 2323 of the second clamping portion 232, and the angle between the first movable member 2341 and the second clamping end part 2323 of the second clamping portion 232 increases; the first movable member 2341 rotates towards a direction close to the second clamping end portion 2313 of the first clamping portion 231, and the angle between the first movable member 2341 and the second clamping end portion 2313 of the first clamping portion 231 decreases; the second movable member 2343 is lifted accordingly, and the second connecting part 23432 of the second movable member 2343 is gradually detached from the slot 2301. During the process of outwardly flipping the second movable member 2343, the second movable member 2343 rotates towards a direction away from the second clamping end portion 2313 of the first clamping portion 231, the first clamping portion 231 is released, and the second movable member 2343 and the first movable member 2341 can move with respect to each other, and the clamping cavity 201 can be opened or closed. When the clamping cavity 201 is in the open state, the second clamping end portion 2313 of the first clamping portion 231 and the second clamping end part 2323 of the second clamping portion 232 are away from each other, and an access opening 237 is formed between the second clamping end portion 2313 of the first clamping portion 231 and the second clamping end part 2323 of the second clamping portion 232, allowing an object, such as the installation element 200, to enter the clamping cavity 201. When the clamping cavity 201 is in the closed state, the second clamping end portion 2313 of the first clamping portion 231 and the second clamping end part 2323 of the second clamping portion 232 are close to each other, and the gap between the second clamping end portion 2313 of the first clamping portion 231 and the second clamping end part 2323 of the second clamping portion 232 is minimized, or even there is almost no gap between the second clamping end portion 2313 of the first clamping portion 231 and the second clamping end part 2323 of the second clamping portion 232.

After opening the clamping cavity 201, the vehicle-mounted camera holder 100 can be detached from the installation element 200, or the clamping cavity 201 can be fitted with the installation element 200. Then, the clamping cavity 201 is closed, and then the closed clamping cavity 201 is locked by the locking structure 234. In the process of locking the closed clamping cavity 201 by the locking structure 234, the second connecting part 23432 of the second movable member 2343 is engaged with the slot 2301 of the second clamping end portion 2313, and then the first movable member 2341 is flipped inward. In the process of flipping inward the first movable member 2341, the first movable member 2341 rotates towards the second clamping end part 2323 of the second clamping portion 232, and the angle between the first movable member 2341 and the second clamping end part 2323 of the second clamping portion 232 decreases. As a result, the first connecting part 23431 of the second movable member 2343 is pulled, and the second connecting part 23432 of the second movable member 2343 is tightly engaged with the slot 2301. The first clamping portion 231 and the second clamping portion 232 are locked, and they cannot move with respect to each other, the clamping cavity 201 is thus in the locked state.

Figure 8A:
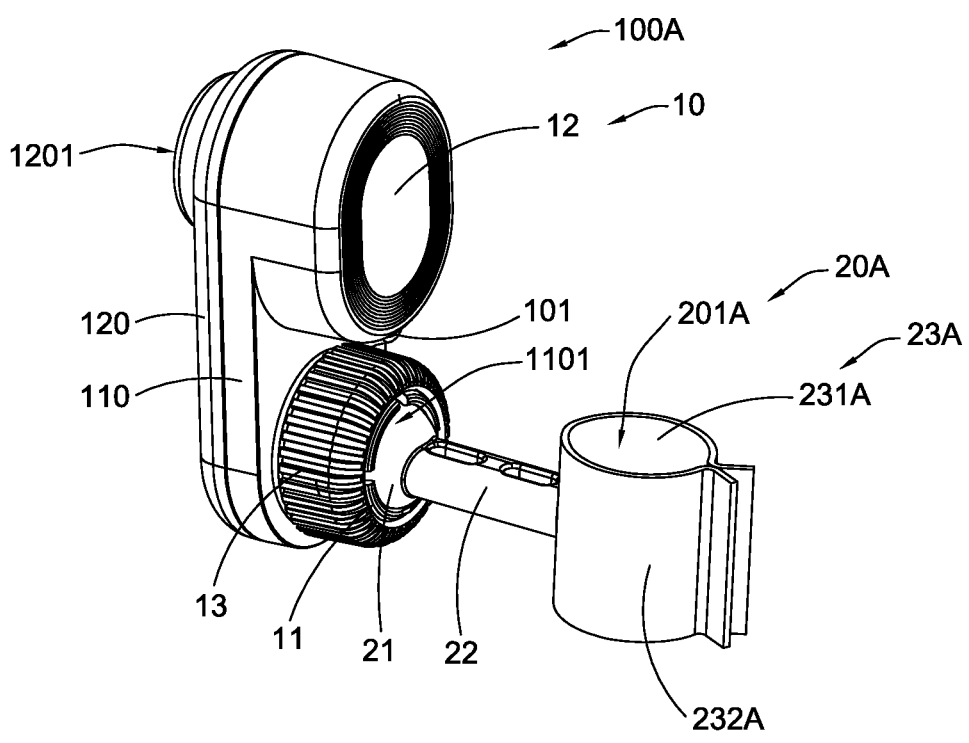
FIG. 8A is a schematic view illustrating a first state of the vehicle-mounted camera holder according to a first alternative mode of the embodiment of the present application.
Figure 8B:
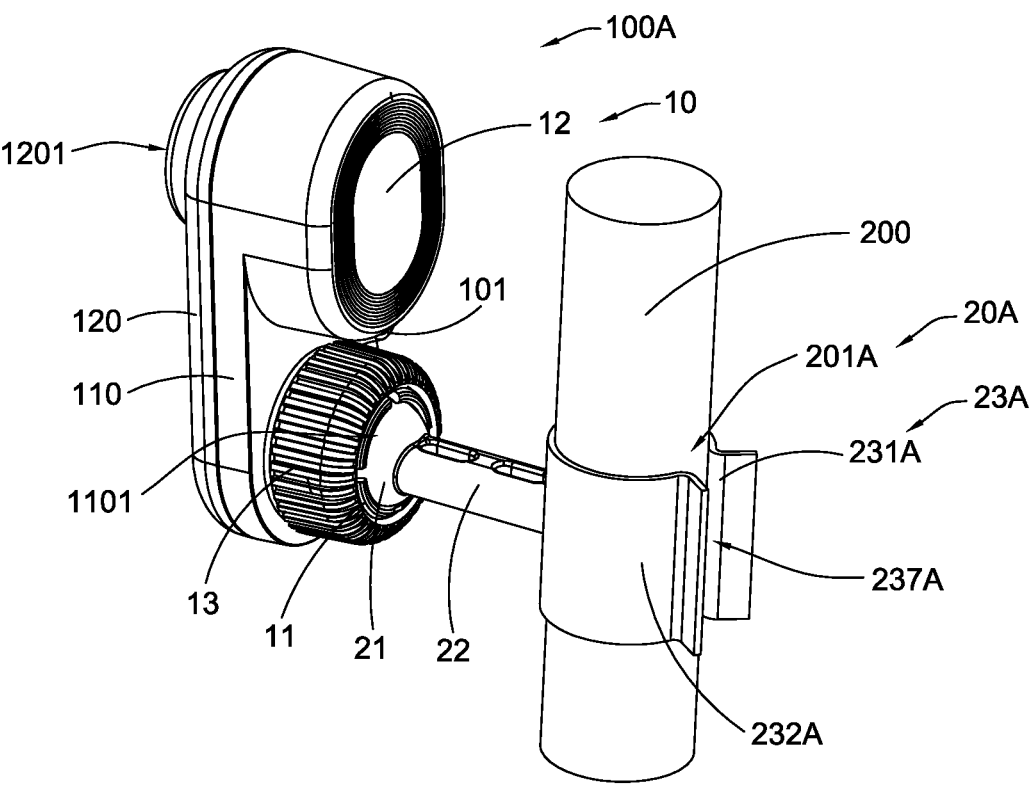
FIG. 8B is a schematic view illustrating a second state of the vehicle-mounted camera holder shown in FIG. 8A according to the first alternative mode of the embodiment of the present application.

In the embodiment where the opening and closing of the clamping cavity 201A is achieved by the elasticity of the clamping element 20A itself, as shown in FIGS. 8A to 8B, the clamping element 20A comprises a first clamping portion 231A and a second clamping portion 232A. The first clamping portion 231A and the second clamping portion 232A together form the clamping cavity 201A which is capable of accommodating a rod-shaped installation element 200A. The second clamping portion 232A is movably connected to the first clamping portion 231A, and the first clamping portion 231A and the second clamping portion 232A are integrally formed or integrally connected. The first clamping portion 231A and/or the second clamping portion 232A are made of an elastic material, allowing the clamping cavity 201A to be switched between an open state and a closed state without the need for an additional tool.

Specifically, tearing the first clamping portion 231A and/or the second clamping portion 232A apart will opens the clamping cavity 201A, allowing the installation element 200 to enter the clamping cavity 201A through an access opening 237A. When the external force applied to the first clamping portion 231A and/or the second clamping portion 232A is removed, the first clamping portion 231A and/or the second clamping portion 232A automatically bounce back, bringing the first clamping portion 231A and the second clamping element 231B to be closer to each other until they come into contact with the installation element 200, thereby clamping the installation element 200 with the clamping element 20A.

The specific material of the first clamping portion 231A and/or the second clamping portion 232A can be implemented as an elastic material which is not limited in this application. For example, it can be rubber, elastic steel, etc.

Figure 9A:
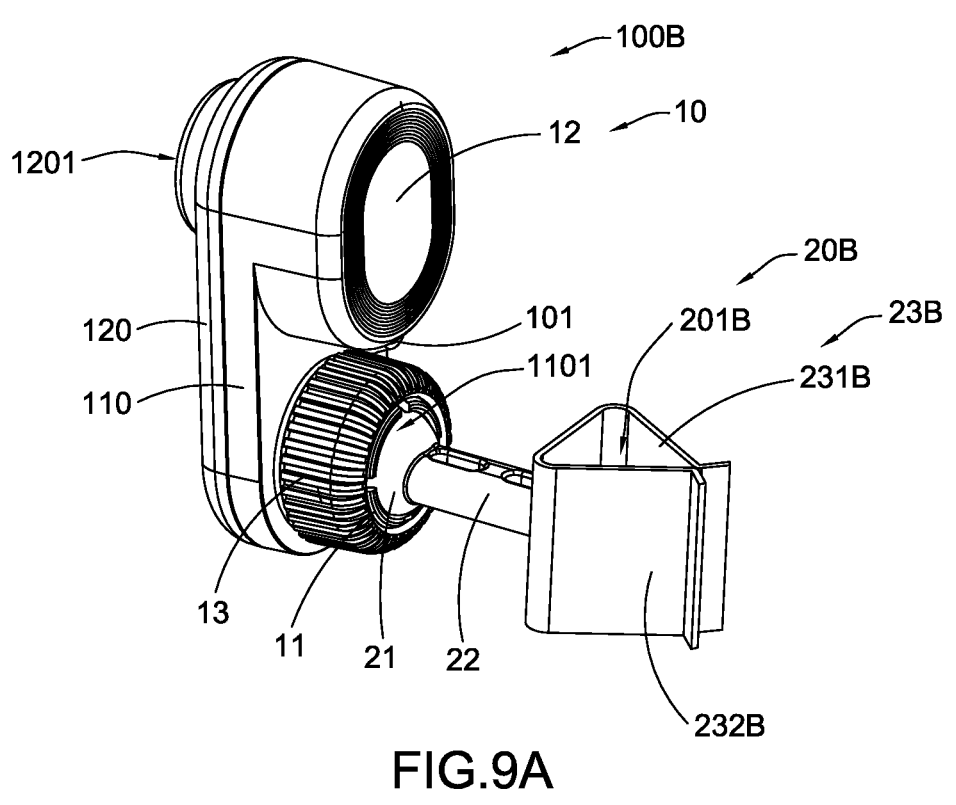
FIG. 9A is a schematic view illustrating a first state of the vehicle-mounted camera holder according to a second alternative mode of the embodiment of the present application.
Figure 9B:
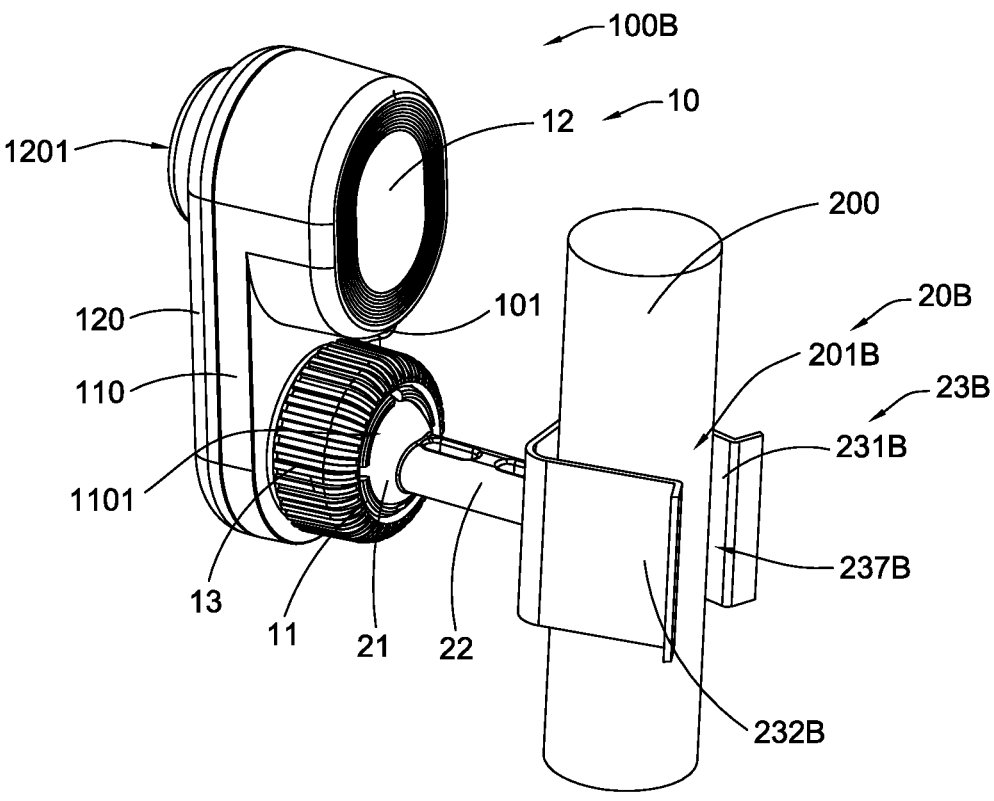
FIG. 9B is a schematic view illustrating a second state of the vehicle-mounted camera holder shown in FIG. 9A according to the second alternative mode of the embodiment of the present application.

In the embodiment in which the opening and closing of the clamping cavity 201B is achieved through the elasticity of the clamping element 20B itself, as shown in FIGS. 9A to 9B, the clamping element 20B comprises a first clamping portion 231B and a second clamping portion 232B. The first clamping portion 231B and the second clamping portion 232B are enclosing to form a clamping cavity 201B which is suitable for accommodating the rod-shaped installation element 200B. The second clamping portion 232B is movably connected to the first clamping portion 231B, and the first clamping portion 231B and the second clamping portion 232B are integrally formed or integrally connected. The first clamping portion 231B and/or the second clamping portion 232B are elastic, so as to allow the clamping cavity 201 to be switched between an open state and a closed state without the need for an additional tool.

Specifically, the clamping cavity 201B can be opened by tearing the first clamping portion 231B and/or the second clamping portion 232B apart, so as to allow the installation element 200 to enter the clamping cavity 201B through an access opening 237B. When the external force applied to the first clamping portion 231B and/or the second clamping portion 232B is removed, the first clamping portion 231B and/or the second clamping portion 232B automatically rebound and approach each other until the first clamping portion 231B and the second clamping element 231B come into contact with the installation element 200, causing the clamping element 20B to clamp the installation element 200.

The specific material of the first clamping portion 231B and/or the second clamping portion 232B can be implemented as a suitable elastic material which is not limited in this application. For example, the material can be rubber, elastic steel, etc.

The shape of the clamping cavity is not limited in this application. For example, the cross-sectional shape of the clamping cavity 201A of the clamping element 20B shown in FIGS. 8A to 8B is circular, and the cross-sectional shape of the clamping cavity 201B of the clamping element 20B shown in FIGS. 9A to 9B is triangular.

In some embodiments of the present application, the clamping element 20 further comprises at least one flexible layer, and the flexible layer is located on the inner side of the first clamping portion 231 and/or the second clamping portion 232. The inner side of the first clamping portion 231 and/or the second clamping portion 232 refers to the side facing the clamping cavity 201, so that the clamping cavity 201 can accommodate the installation element 200 of different sizes, thereby allowing the clamping element 20 to be installed on installation element 200 of different radial sizes. When the vehicle-mounted camera holder 100 is clamped to the installation element 200, the installation element 200 is pressed by the flexible layer, so that the vehicle-mounted camera holder 100 is stably installed on the installation element 200.

In one example of the present application, the clamping element 20 comprises two flexible layers, i.e. a first flexible layer 235 and a second flexible layer 236. The first flexible layer 235 is disposed at the inner side of the first clamping portion 231, and the second flexible layer 236 is disposed on the inner side of the second clamping portion 232.

Optionally, the first flexible layer 235 can be detachably disposed on the inner side of the first clamping portion 231 or fixed to the inner side of the first clamping portion 231; the second flexible layer 236 can be detachably disposed on the inner side of the second clamping portion 232 or fixed to the inner side of the second clamping portion 232. In this way, the first flexible layer 235 and/or the second flexible layer 236 with different thicknesses can be replaced according to actual needs.

It is worth mentioning that, in the present embodiment of the application, the clamping element 20 can be movably installed on the holder body 10. Correspondingly, the holder body 10 can move with respect to the clamping element 20. When the vehicle-mounted camera holder 100 is installed on the installation element 200 through the clamping element 20, the camera installing portion 12 can rotate 360 degrees with respect to the installation element 200, so that the camera 30 installed on the camera installing portion 12 can be adjusted to an appropriate position and posture according to actual needs. The posture refers to the position and placement angle.

In the illustrated example of the present application, the first clamping portion 231 and the second clamping portion 232 form a clamping body 23 of the clamping element 20. The clamping element 20 is rotatably installed on the holder body 10. In this example, the clamping element 20 further comprises a steering ball 21 which is connected to the first clamping portion 231 or the second clamping portion 232 of the clamping body 23. The steering ball 21 is accommodated within the clamping element installing portion 11 and is rotatably installed therein. Alternatively, the steering ball 21 may be connected to the camera installing portion 12 and rotatably accommodated in the clamping element 20.

In this example, the steering ball 21 is not fixed to the clamping element installing portion 11, so that the steering ball 21 can rotate without being fixed to a pivot point. It can rotate around multiple pivot points or multiple axes, and achieve 360-degree rotation.

In this example, the clamping element installing portion 11 comprises a first cavity section 111 and a second cavity section 112. The second cavity section 112 is extended from the first cavity section 111 in a direction away from an accommodating chamber 102, and the minimum inner diameter of the second cavity section 112 is smaller than the diameter of the steering ball 21. The clamping element installing portion 11 has an opening 1101, and the second cavity section 112 is extended from the first cavity section 111 to the opening 1101 of the clamping element installing portion 11, and the inner diameters of the second cavity section 112 gradually decrease from the first cavity section 111 towards the outside. The minimum inner diameter of the second cavity section 112 is smaller than the diameter of the steering ball 21. The inner diameter of the opening 1101 of the clamping element installing portion 11 is smaller than the diameter of the steering ball 21. In this way, even if the steering ball 21 is not connected to the clamping element installing portion 11, the steering ball 21 is accommodated in the clamping element installing portion 11 and does not come out of the clamping element installing portion 11.

It should be understood that the steering ball 21 can also be connected to the clamping element installing portion 11. It should also be understood that the clamping element installing portion 11 can have a certain elasticity, and when the steering ball 21 is pulled by a larger external force, it can be detached from the clamping element installing portion 11. When the steering ball 21 is pushed by a larger external force, the opening 1101 of the clamping element installing portion 11 is opened and the steering ball 21 can enter the clamping element installing portion 11.

In this example, the clamping element 20 further comprises a connecting arm 22, which is extended between the steering ball 21 and the clamping body 23. Optionally, the connecting arm 22 can be provided with one or more through holes 2201, and the positions, shapes, and numbers of the through-holes 2201 can be set according to design requirements to create different shapes for the connecting arm 22. The through holes 2201 are also used for the passage of ropes, so as to facilitate the storage by a user.

In this example, the clamping element installing portion 11 comprises at least two clamping element installing portion bodies 1110 which are spaced apart from each other and arranged circumferentially. The holder body 10 further comprises a cover body 13 which is fitted outside the clamping element installing portion 11 and can tighten the clamping element installing portion 11 to prevent the steering ball 21 from easily coming off the clamping element installing portion 11. The shape of the cover body 13 is adapted to the shape of the clamping element installing portion 11. Correspondingly, the cover body 13 comprises a first cavity portion 131 and a second cavity portion 132, the first cavity portion 131 is fitted at an outside of the first cavity section 121 and the second cavity portion 132 is fitted at an outside of the second cavity section 122. The second cavity portion 132 of the cover body 13 is extended outward from the first cavity portion 131 of the cover body 13, and the inner diameters of the second cavity portion 132 is gradually decreased from the inner diameter of the first cavity portion 131 of the cover body 13. The cover body 13 also comprises a plurality of outer edges 133 protruding from its outer surface. Optionally, the cover body 13 is threaded onto the clamping element installing portion 11. The outer edges 133 not only serve to decorate the appearance, but also increase the roughness of the cover body 13, so as to allow the user to easily detach the cover body 13 from the clamping element installing portion 11.

It should be understood that the clamping element 20 can be movably installed on the holder body 10 in other ways. For example, the clamping element 20 can be slidably installed on the holder body 10 or installed on the holder body 10 in a rotatable manner through other means.

In this embodiment, the clamping element installing portion 11 and the camera installing portion 12 are offset from each other in the length direction L defined by the holder body 10. The camera installing portion 12 has a camera installing opening 1201 which is suitable for exposing a side end face of the camera 30. The camera installing opening 1201 is configured to protrude from the side end face of the camera 30, this can protect the camera 30 to some extent.

In this embodiment, the holder body 10 has the accommodating chamber 102 which can be partially used to accommodate the camera 30. The holder body 10 can be a one-piece molded shell or can be formed by combining a plurality of components.

In the illustrated example of the present application, the holder body 10 comprises a first shell member 110 and a second shell member 120. The first shell member 110 comprises a first shell body 11010, a first camera installing cavity body 121, and the clamping element installing portion 11. The second shell member 120 comprises a second shell body 12010 and a second camera installing cavity body 122. The first shell body 11010 has a first accommodating cavity 11011, and the second shell body 12010 has a second accommodating cavity 12011. The second first shell member 110 and the second shell member 120 are engaged with each other, and the first accommodating cavity 11011 is opposite to and in communication with the second accommodating cavity 12011. The clamping element installing portion 11 is formed on one side of the first shell body 11010 away from the second shell member 120, and is protruded from the outer surface of the first shell body 11010 in the thickness direction H of the holder body 10. The first camera installing cavity body 121 is formed on the side of the first shell body 11010 away from the second shell member 120, and is protruded from the outer surface of the first shell body 11010 in the thickness direction H of the holder body 10. The space in the first camera installing cavity body 121 is in communication with the first accommodating cavity 11011. The first camera installing cavity body 121 can be integrally formed with the first shell body 11010, or integrally connected, or is a separate component which is joined with the first shell body 11010. The second camera installing cavity body 122 is provided on the side of the second shell body 12010 away from the first shell member 110, and is protruded from the outer surface of the second shell body 12010 in the thickness direction H of the holder body 10. The space in the second camera installing cavity body 122 is in communication with the second accommodating cavity 12011. The second camera installing cavity body 122 can be integrally formed with the second shell member 12010, or integrally connected, or is a separate component which is joined with the first shell body 11010. The first accommodating cavity 11011, the second accommodating cavity 12011, the first camera installing cavity body 121, and the second camera installing cavity body 122 together form the accommodating chamber 102. The camera installing opening 1201 is provided at the second camera installing cavity body 122, and is suitable for exposing the side end face of the camera 30. The camera installing portion 12 is formed by the first camera installing cavity body 121, the second camera installing cavity body 122, a portion of the first accommodating cavity 11011 adjacent to the first camera installing cavity body 121, and a portion of the second accommodating cavity 12011 adjacent to the second camera installing cavity body 122.

In some embodiments of the present application, the vehicle-mounted camera holder 100 is also equipped with a camera 30, which is accommodated in the accommodating chamber 102.

As mentioned above, the camera 30 can be communicatively connected to the terminal device 500. The camera 30 and the terminal device 500 can be connected by an electrical connection line. Accordingly, the vehicle-mounted camera holder 100 also has a wiring port 101, which is adapted for the electrical connection line to pass through. It should be understood that the camera 30 can also be wirelessly communicated with the terminal device 500.

The above description combines specific embodiments to illustrate the basic principles of the present application. However, it should be noted that the advantages, benefits, and effects mentioned in the present application are only examples and not limitations. It should not be assumed that these advantages, benefits, and effects are necessarily present in all embodiments of the present application. In addition, the specific details disclosed above are for illustrative and explanatory purposes only, and not limitations. These details do not restrict the present application to the specific details disclosed. The functional and structural principles of the present application have been demonstrated and described in the embodiments, and without departing from the principles disclosed herein, the embodiments of the present invention can be modified or altered in any way.

What is claimed is:

1. A vehicle-mounted camera holder for holding a camera and for being mounted on an installation element which is a support rod of a headrest, comprising:
   a holder body which comprises a camera installing portion for holding a camera; and
   a clamping element which comprises a clamping body coupled to said holder body, wherein said clamping body comprises a first clamping portion and a second clamping portion movably coupled to said first clamping portion to define a clamping cavity which is switched between an open state in which an access opening is formed to allow the installation element to enter said clamping cavity and a closed state in which the installation element is clamped at said clamping cavity without the need for an additional tool;
   wherein said holder body comprises:
   a first shell member having a first surface, wherein said camera installing portion is formed on said first surface of said first shell member;
   a second shell member, having a second surface, coupled with each other; and
   an accommodating chamber formed within said first shell member and said second shell member when said first shell member and said second shell member are coupled with each other;
   wherein said holder body is adapted for holding the camera at a position that the camera is accommodated within said accommodating chamber and between said first surface of said first shell member and said second surface of said second shell member.

2. The vehicle-mounted camera holder according to claim 1, wherein said clamping element comprises a locking structure lockably coupled to said first clamping portion and said second clamping portion, wherein said locking structure is switched between a locked state for shifting said clamping cavity into said closed state and an unlocked state to allow said clamping body to define said access opening which is communicated to said clamping cavity, wherein said camera holder further comprises a wiring port formed on said first surface of said first shell member for connecting with the camera when the camera is received in said accommodating chamber.

3. The vehicle-mounted camera holder according to claim 2, wherein said first clamping portion is pivotally coupled to said second clamping portion at a first side of said clamping body, wherein said locking structure is coupled between said first clamping portion and said second clamping portion at a second side of the said clamping body opposite to said first side of said clamping body.

4. The vehicle-mounted camera holder according to claim 3, wherein said locking structure is pivotally connected to said first clamping portion and is detachably coupled to said second clamping portion, wherein in said locked state, said locking structure is locked with said second clamping portion, wherein in said unlocked state, said locking structure is detached from said second clamping portion, so as to define said access opening between said first clamping portion and said second clamping portion.

5. The vehicle-mounted camera holder according to claim 4, wherein said locking structure comprises a first movable member and a second movable member which is movably coupled to said second movable member, wherein said first movable member is pivotally connected to said first clamping portion, said second movable member is detachably and lockably coupled with said second clamping portion.

6. The vehicle-mounted camera holder according to claim 5, wherein said second movable member comprises a first connecting part which is pivotally connected to said first movable member and a second connecting part which is detachably and lockably coupled with said second clamping portion.

7. The vehicle-mounted camera holder according to claim 6, wherein in said locked state, said second connecting part of said second movable member is engaged with said second clamping portion through a hook which is engaged with a slot.

8. The vehicle-mounted camera holder according to claim 6, wherein said first movable member is configured to be flipped down to prevent the pivotal movement of said first connecting part of said second movable member, so as to retain said second connecting part of said second movable member on said second clamping portion, and said first movable member is configured to be flipped up to allow the pivotal movement of said first connecting part of said second movable member, so as to allow said second connecting part of said second movable member to be disengaged with said second clamping portion.

9. The vehicle-mounted camera holder according to claim 8, wherein said locking structure is configured in such a manner that when said locking structure is moved between said locked state and said unlocked state, the pivotal movement of said first movable member and the pivotal movement of said second movable member are in two opposite directions.

10. The vehicle-mounted camera holder according to claim 6, wherein said clamping element further comprises a first pivot axle, a second pivot axle, and a third pivot axle, wherein said first clamping portion is pivotally connected to said second clamping portion by said first pivot axle at said first side of said clamping body, wherein said first clamping portion is pivotally connected to said first movable member by said second pivot axle, wherein said first connecting part of said second movable member is pivotally connected to said first movable member by said third pivot axle.

11. The vehicle-mounted camera holder according to claim 10, wherein said second pivot axle is provided at an outer side of said third pivot axle in such a manner that the pivotal movement of said first movable member with respect to said second pivot axle is capable of adjusting the position of said third pivot axle.

12. The vehicle-mounted camera holder according to claim 10, wherein said first clamping portion has a second gap, wherein said first movable member comprises a connecting end part which is extended into said second gap and pivotally connected to said first clamping portion by two said second pivot axles, and a free end part which is capable of being flipped up and down.

13. The vehicle-mounted camera holder according to claim 12, wherein said connecting end part of said first movable member has a third gap, wherein said first connecting part of said second movable member is extended into said third gap of said connecting end part of said first movable member.

14. The vehicle-mounted camera holder according to claim 1, wherein said holder body is movably with respect to said clamping element, so as to adjust a position of the camera installed at said camera installing portion, wherein said holder body further has a camera installing opening formed through said second surface of said shell member to communicate with said accommodating chamber for aligning with an end face of the camera when the camera is held within said accommodating chamber.

15. The vehicle-mounted camera holder according to claim 14, further comprising a camera installing cavity body and a steering ball for rotatably coupling said holder body with said clamping element, so as to adjust a position of the camera installed at said camera installing portion, wherein said camera installing cavity body is protruded from said second surface of said second shell member at said camera installing opening for allowing the camera being extended into said camera installing cavity body through said camera installing opening.

16. The vehicle-mounted camera holder according to claim 15, wherein said steering ball is connected to said clamping body, wherein said holder body comprises a clamping element installing portion, wherein said steering ball is disposed in said clamping element installing portion and is rotatable in 360 degrees, wherein said camera installing portion and said clamping element installing portion are formed on said first surface of said first shell member.

17. The vehicle-mounted camera holder according to claim 16, wherein said clamping element installing portion has an opening and comprises a first cavity section and a second cavity section which is extended from said first cavity section to said opening, wherein an minimum inner diameter of said second cavity section is smaller than a diameter of said steering ball, wherein said camera installing cavity body is integrally protruded from said second surface of said second shell member at said camera installing opening.

18. The vehicle-mounted camera holder according to claim 16, wherein said clamping element installing portion comprises at least two clamping element installing portion bodies which are spaced apart from each other and arranged circumferentially, wherein said holder body further comprises a cover body which is fitted outside said clamping element installing portion to tighten said clamping element installing portion to prevent said steering ball from easily coming off said clamping element installing portion.

19. The vehicle-mounted camera holder according to claim 1, further comprising one or more flexible layers disposed in said clamping body, wherein the camera is built-in with said holder body within said accommodating chamber thereof.

20. The vehicle-mounted camera holder according to claim 1, wherein at least one of said first clamping portion and said second clamping portion is made of an elastic material, so as to achieve the switch between said opening state and said closed state by the elasticity of said clamping element, wherein said first shell member has a first accommodating cavity and said second shell member has a second accommodating cavity, wherein said first accommodating cavity and said second accommodating cavity are combined to form said accommodating chamber when said first shell member and said second shell member are coupled with each other, such that a first portion of the camera is disposed in said first accommodating cavity of said first shell member while a second portion of the camera is disposed in said second accommodating cavity of said second shell member.

* * * * *